United States Patent Office 3,336,135
Patented Aug. 15, 1967

3,336,135
COLORED MATERIALS PREVENTED FROM FADING
Yahachi Terashima and Kazuya Sano, Tokyo, Japan, assignors to Fuji Shashin Film Kabushiki Kaisha, Minamiashigara-machi, Ashigarakami-gun, Kanagawa-ken, Japan, a corporation of Japan
No Drawing. Filed Dec. 28, 1964, Ser. No. 421,638
Claims priority, application Japan, Aug. 30, 1962, 37/36,211
14 Claims. (Cl. 96—100)

The present invention which is a continuation-in-part of application Ser. No. 301,900, filed Aug. 13, 1963 relates to colored materials prevented from fading, and more particularly to the prevention of fading of the material colored by azomethine or indoaniline dyestuff.

In general, the term "azomethine dyestuff" indicates oxidation-condensation products of a compound having at least one active methylene group and an aromatic primary amino-compound or dyes having structure similar thereto, while the term "indoaniline dyestuff" means oxidation-condensation products of a compound having a phenolic hydroxyl group and an aromatic primary amino-compound, or dyes having structure similar thereto, which are prepared by other processes.

Since the above dyestuffs are mostly used in color photography, and since the present invention is especially useful for the prevention of fading of the image of color photograph, the present invention will be explained, laying stress on its application to color photography. Of course, the invention is not limited to color photography but covers all materials colored by said dyestuffs.

It has been known that the light-stability of photographic image dyes is enhanced by using ultraviolet ray absorbing agents to reduce the amount of light absorbed by dyes. Ultraviolet absorbing agents, however, often give rise to deterioration of the image due to coloration or discoloration of the agents used. Moreover, it often happens that a sufficient effect is not produced because of their incompatibility with gelatin solution.

According to our present invention, the compounds employed do not necessarily act as effective ultraviolet absorbers. We have now found that certain kinds of compounds known as free radical traps retard fading of dyes. They show no coloration or discoloration because of the little absorption in the ultraviolet and visible region, and they give no deleterious effect with respect to homogeneity and photographic properties of the coatings because of the smaller amount needed. They also show more remarkable effect of preventing fading by adding with coloring matter.

They have the following general formula:

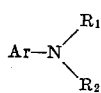

wherein, $R_1$ is an unsubstituted alkyl, hydroxy-substituted alkyl or alkanesulfonamide-substituted alkyl group, $R_2$ is hydrogen, an unsubstituted alkyl, hydroxy-substituted alkyl or alkanesulfonamide-substituted alkyl group, and Ar is an unsubstituted phenyl group or a phenyl group substituted with one or more alkyl and/or alkoxyl groups.

$R_1$ and $R_2$ may be condensed with each other to form a heterocyclic ring, or either of them may be in the form of a heterocyclic ring with Ar group.

The examples of compounds suitable for use according to the present invention are as follows:

(1) N-methylaniline

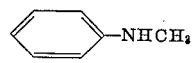

(2) N-ethylaniline

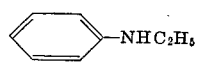

(3) N,N-pentamethyleneaniline

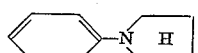

(4) N-methyl-3-methylaniline

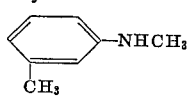

(5) N-ethyl-3-methylaniline

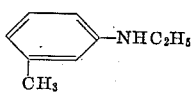

(6) N-ethyl-4-octylaniline

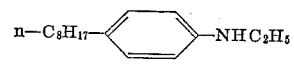

(7) N-(2-hydroxyethyl)-3-methylaniline

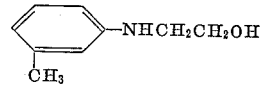

(8) N-methyl-4-octylaniline

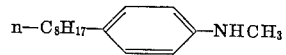

(9) N,N-dimethyl-2-methoxyaniline

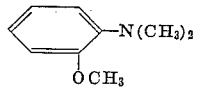

(10) N,N,-diethyl-2-methoxyaniline

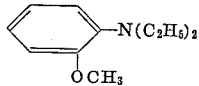

(11) N-(2-methanesulfonamidoethyl)-4-methylaniline

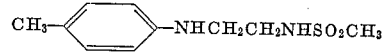

(12) N-dodecyl-3-methoxyaniline

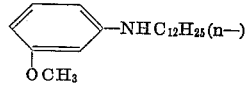

(13) N-ethyl-N-(2-methanesulfonamidoethyl)-3-methylaniline

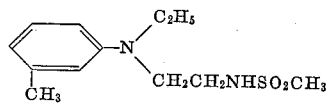

(14) N-methyl-2,4-dimethylaniline

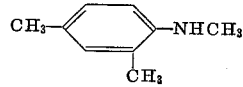

(15) N-ethyl-2,4-dimethylaniline

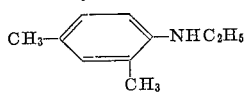

(16) N-(2-methanesulfonamidoethyl)-1,2,3,4-tetrahydroxyquinoline

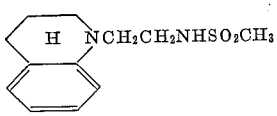

(17) N-methyl-2-methoxy-5-methylaniline

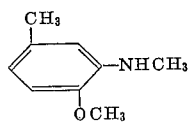

(18) N-ethyl-2-methoxy-5-methylaniline

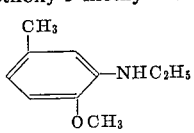

Each of the above compounds 1–18 have been prepared prior to the filing date of this application and are referred to in the literature as follows:

| Compound: | Reference |
|---|---|
| 1 and 2 | Beilstein: "Handbuch der Organischen Chemie," Bd. 12, System No. 1599. |
| 3 | Ibid., Bd. 20–11, System No. 3037. |
| 4 and 5 | Ibid., Bd. 12, System No. 1682. |
| 6 and 8 | Prepared from the process of U.S. Patent No. 2,118,493 (Coffey et al.) in which p-octylaniline is methylated and ethylated by the process of the above 4 and 5. |
| 7 | Beilstein: "Handbuch der Organischen Chemie," Bd. 12–11, System No. 1682. |
| 9 and 10 | Ibid., Bd. 13, System No. 1832. |
| 11 | Prepared from the equi-molar reaction of p-anisidine and B-methanesulfonamidoethyl bromide according to the process of U.S. Patent No. 2,566,259. |
| 12 | Prepared from the synthesis of m-toluidine and dodecyl bromide (Org. Syn. Coll. vol. 1, p. 29) according to the process of the above 4. |
| 13 | U.S. Patent No. 2,552,244. |
| 14 and 15 | Beilstein, "Handbuch der Organischen Chemie," Bd. 12, System No. 1704. |
| 16 | U.S. Patent No. 2,566,259. |
| 17 and 18 | Prepared from the methylation and ethylation of 3-amino-4-methoxy tolud methoned in Beilstein: "handbuch der Organischem Chemie," Bd. 13, System No. 1855 according to the process of the above 4 and 5. |

The amount and kind of the compounds shown by the above formula, to be employed, varies over a wide range depending on their chemical structures, and the properties and amount of dyes, etc. Generally a suitable amount of the compound is 0.1 to 100% by weight based on the dye. Thus, when applied in color photography, 0.01% to 10% by weight of the compounds are incorporated in gelatinous silver halide emulsions to give a desirable result. Little effect is observed when the amount is less than 0.01% by weight and marked increase of the effect is not obesrved when the amount is more than 10% by weight. Deleterious effects are rather observed on homogenity and physical properties of the coatings in the latter case. Generally speaking, a compound having an alkanesulfonamide group in $R_1$ exhibits a larger preventive effect and a lower tendency to evaporate than an unsubstituted one. A compound having a hydroxyl group or an alkanesulfonamide group in $R_1$ is often suitable to be added to the emulsion as a solution in a low-boiling-point solvent, such as, ethanol, acetone, ethyl acetate or a mixture thereof. On the other hand, one carrying a hydrocarbon residue having more than seven carbon atoms in either $R_1$, $R_2$ or Ar is generally fitted to be added as a solution in a high-boiling-point, water-insoluble solvent or a mixture thereof.

As the first step of our studies, several dyes were prepared from couplers and developing agents used conventionally in color photography, to the solution of which were added the above described compounds known as radical traps. The solutions thus obtained were exposed to a xenon arc lamp to examine the effect. Data are shown below.

*Example 1*

0.1% on the basis of weight of di-n-butyl phthalate of N-ethyl-m-toluidine was added into 1/40,000 mole solution in di-n-butyl phthalate of dye, and the resulting solution was exposed to a xenon arc lamp for one hour. The value in percentage of the optical densities after exposure to those before exposure, using wave length of 445 m$\mu$, this, $D/D_0 \times 100$ (hereinafter to be referred to as $d$) was 97.5% and, in case N-ethyl-m-toluidine was not added (hereinafter to be referred to as $d'$), 90.5%.

Dye 1

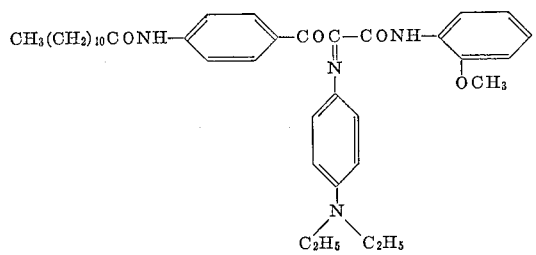

*Example 2*

A solution was prepared as in Example 1, using dye 2 in place of dye 1. At wavelength of 670 m$\mu$, $d$ was 48.4% and $d'$ 13.0%.

Dye 2

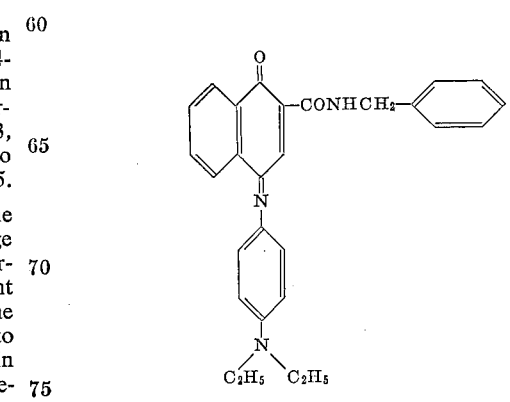

Example 3

A solution was prepared as in Example 1, using dye 3 in place of dye 1. At wavelength of 670 mμ, d was 50.0% and d' 25.0%.

Dye 3

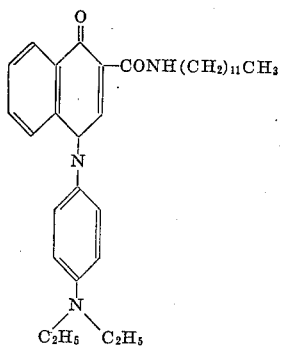

Example 4

A solution was prepared as in Example 1, using dye 4 in place of dye 1. At wavelength of 525 mμ, d was 100% and d' 25.0%.

Dye 4

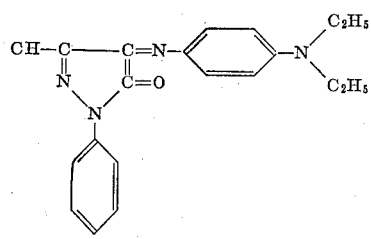

Example 5

To 1/40,000 mole solution in di-n-butyl phthalate of dye 3 was added 0.1% of fading-preventive 1 in relation to di-n-butyl phthalate. The Fade-O-Meter shows that at 670 mμ after one-hour exposure, d was 83% and d' 55%.

Fading-preventive 1

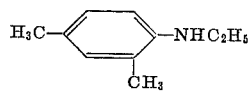

Example 6

The procedure of Example 5 is followed using fading-preventive 2 in place of fading-preventive 1. At 670 mμ, d was 100%, and d' 55%.

Fading-preventive 2

Example 7

The procedure of Example 5 is followed using fading-preventive 3 in place of fading-preventive 1. At 670 mμ, d was 100%, and d' 55%.

Fading-preventive 3

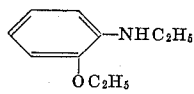

Example 8

The procedure of Example 5 is followed using fading-preventive 4 in place of fading-preventive 1. At 670 mμ, d was 98%, and d' 55%.

Fading-preventive 4

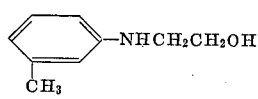

Example 9

The procedure of Example 5 is followed using fading-preventive 5 in place of fading-preventive 1. At 670 mμ, d was 95%, and d' 55%.

Fading-preventive 5

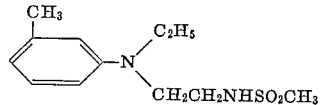

Example 10

To 1/40000 mole solution in di-n-butyl phthalate of dye 4 was added 0.1% of fading-preventive 6 in relative to di-n-butyl phthalate. The Fade-O-Meter shows that at 525 mμ after one-hour exposure, d was 98%, and d' 80%.

Fading-preventive 6

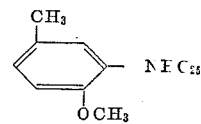

Example 11

The procedure of Example 10 is followed using fading-preventive 7 in place of fading-preventive 6. At 525 mμ, d was 95%, and d' 80%.

Fading-preventive 7

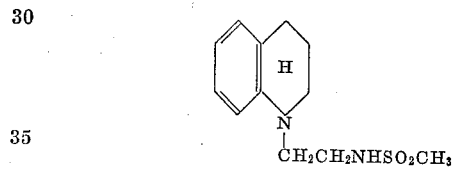

TABLE 1.—EFFECT OF N-ETHYL-M-TOLUIDINE ON FADING OF DYES

| Addition Agent | Dye | | | |
|---|---|---|---|---|
| | 1 | 2 | 3 | 4 |
| None | 90.5 | 13.0 | 32.4 | 25.0 |
| Present | 97.5 | 48.4 | 50.0 | 100 |
| Compared wave length (mμ) | 445 | 670 | 670 | 525 |

As is evident from these examples, the compound of the present invention can improve light-stability of dyes. In addition to the examples shown above, we have tested many other kinds of dyes and solvents, all of them leading to similar results. As for solvents, for example, similar effect was observed with water-ethanol mixture of any proportion as well as ethyl acetate, acetone, etc. Thus, the compounds useful in the present invention exhibit the effect so long as they exist together with dyes, and it does not matter what solvent is employed, nor what support is used when they are applied to photographic materials.

In order to incorporate them into photographic layers, we can either dissolve them in suitable solvents and then add the solutions into photographic emulsions, or dissolve them in water-insoluble, comparatively high-boiling-point solvents, e.g., boiling above 175° C., disperse the resulting solution in gelatin solution and then add the emulsion thus obtained into photographic emulsions. Emulsions thus prepared can be coated and dried through conventional procedures.

Photographic additives must not give any deleterious effect on photographic properties. There are some organic compounds that give rise to a great change of gradation, decrease of sensitivity or increase of fog. The compounds suitable for practising our present invention, on the contrary, give little influences on photographic properties.

The following examples will serve to illustrate how this invention is practised in color photography an enhances the light-stability of photographic image dyes.

Example 12

200 ml. of 5% alkaline solution of sodium 1-hydroxy-N-octadecyl-2-naphthamide-4-sulfonate was added to 1 kg. of silver chlorobromide emulsion. To this mixture was added 1, 10 or 100 ml. of 10% methanolic solution of N-methylaniline, and then the resulting mixtures were coated on baryta papers and dried. The samples thus obtained were exposed and processed in a usual manner and after drying exposed to a xenon arc lamp for one-hour. The following table 2 shows in percentage the resulting optical densities (D) of dyes relative to initial densities ($D_o$).

TABLE 2.—RELATION OF THE CONTENT OF SOME ADDITIVES WITH FADING OF DYES

| Sample No. | 1 | 2 | 3 | 4 |
|---|---|---|---|---|
| Additive | None | N-methylaniline | | |
| Amount of solution added (ml.) | None | 1 | 10 | 100 |
| $D/D_o \times 100$ (percent) | 62 | 62 | 68 | 76 |

Example 13

The procedure of Example 12 is followed using N-ethyl-m-toluidine in place of N-methylaniline.

TABLE 3

| Sample No. | 5 | 6 | 7 |
|---|---|---|---|
| Amount of solution added (ml.) | 1 | 10 | 100 |
| $D/D_o \times 100$ (percent) | 64 | 68 | 76 |

It is evident from these data that N-methylaniline and N-ethyl-m-toluidine have a preventive effect on the light fading of dyes.

The next Table 4 gives data of usual color sensitometric measurements of the above mentioned samples in order to illustrate the little influences of the compounds on photographic characteristics. In this table, column A shows the characteristic values of the samples and column B shows those of the corresponding samples after keeping at 50° C. in an atmosphere of 80% relative humidity for two days.

TABLE 4.—PHOTOGRAPHIC CHARACTERISTICS

| Condition | Photographic characteristics | Sample No. | | | | | | |
|---|---|---|---|---|---|---|---|---|
| | | 1 | 2 | 3 | 4 | 5 | 6 | 7 |
| A | Relative speed | 1.95 | 19.3 | 1.99 | 2.04 | 1.99 | 2.02 | 2.14 |
| | Gamma | 2.97 | 2.94 | 3.00 | 3.46 | 3.20 | 2.77 | 3.34 |
| | Fog | 0.01 | 0.01 | 0.01 | 0.02 | 0.01 | 0.02 | 0.02 |
| B | Relative speed | 2.08 | 2.06 | 2.17 | 2.09 | 2.06 | 2.09 | 2.08 |
| | Gamma | 2.45 | 2.40 | 2.53 | 2.62 | 2.58 | 2.45 | 2.46 |
| | Fog | 0.02 | 0.02 | 0.02 | 0.02 | 0.20 | 0.02 | 0.02 |

Both of the compounds seem to give no substantial influence on the magnitude of changes in photographic characteristics by heat and humidity except slight changes in sensitivity and gamma. In practice, correction may be easily carried out by adjusting the emulsion preparation.

Example 14

1-hydroxy-4-chloro-2-naphtho-n-dodecylamide, an additive, dibutyl phthalate, tri-2-tolyl phosphate and aqueous gelatin solution were mixed together in the following properties and emulsified in a mixing device for half an hour. After adding 200 g. of the resulting mixture into 1 kg. of a silver chlorobromide emulsion, followed by coating, drying, exposing and then developing, the samples thus prepared were tested in the same manner as the above example and were compared.

TABLE 5.—FORMULATION (EACH IN GRAMS)

| Sample No. | 1 | 2 | 3 | 4 | 5 | 6 | 7 |
|---|---|---|---|---|---|---|---|
| 10% aq. gelatin solution | 100 | 100 | 100 | 100 | 100 | 100 | 100 |
| Dibutyl phthalate | 9 | 9 | 9 | 9 | 9 | 9 | 9 |
| Tri-2-tolyl phosphate | 1 | 1 | 1 | 1 | 1 | 1 | 1 |
| 1-hydroxy-4-chloro-N-octadecyl-2-naphthamide | 10 | 10 | 10 | 10 | 10 | 10 | 10 |
| N-methyl aniline | 0 | 0.1 | 1 | 10 | 0 | 0 | 0 |
| N-ethyl toluidine | 0 | 0 | 0 | 0 | 0.1 | 1 | 10 |

TABLE 6.—COMPARISON OF FADING

| Sample No. | 1 | 2 | 3 | 4 | 5 | 6 | 7 |
|---|---|---|---|---|---|---|---|
| $D/D_o \times 100$ | 69 | 80 | 82 | 84 | 80 | 84 | 92 |

Both of N-methylaniline and N-ethyl-m-toluidine are shown to exhibit a preventive tendency.

The following Table 7 shows the result of color sensitometric measurement. There is no serious trouble with respect to their practical use in color photography.

TABLE 7.—PHOTOGRAPHIC CHARACTERISTICS

| Condition | Photographic characteristics | Sample No. | | | | | | |
|---|---|---|---|---|---|---|---|---|
| | | 1 | 2 | 3 | 4 | 5 | 6 | 7 |
| A | Relative speed | 2.24 | 2.28 | 2.30 | 2.28 | 2.28 | 2.30 | 2.32 |
| | Gamma | 5.0 | 4.35 | 4.20 | 4.0 | 5.0 | 4.8 | 4.15 |
| | Fog | 0.04 | 0.05 | 0.05 | 0.05 | 0.04 | 0.03 | 0.03 |
| B | Relative speed | 2.23 | 2.23 | 2.24 | 2.80 | 2.24 | 2.24 | 2.20 |
| | Gamma | 4.6 | 4.90 | 5.30 | 4.1 | 5.6 | 5.4 | 4.60 |
| | Fog | 0.04 | 0.03 | 0.05 | 0.03 | 0.06 | 0.04 | 0.05 |

Example 15

The procedure of Example 14 is followed using 1 g. of the fading-preventive 1 in place of N-methyl-aniline (or N-ethyl toluidine). $d$ was 79%, and $d'$ 68%.

Example 16

The procedure of Example 14 is followed using 1 g. of the fading-preventive 2 in place of N-methyl-aniline. $d$ was 73%, and $d'$ 68%.

Example 17

The procedure of Example 14 is followed using 1 g. of the fading-preventive 3 in place of N-methyl-aniline. $d$ was 72%, and $d'$ 68%.

The compounds of the present invention can also be applied to increase the light-stability of dyes in color filter materials. In the case of the color filter materials, the preferred amount of the compound to be added is 0.1 to 100% by weight to the amount of a dye to be used.

*Example 18*

1.2 g. of dye 4 and 0.6 g. of N-ethyl-m-toluidine were dissolved in a mixture composed of 700 ml. of acetone and 300 ml. of methanol, and the resulting solution was then coated on a transparent support in a usual manner. The present filter was compared with a filter containing no N-ethyl-m-toluidine about fading. The proportions ($D/D_o$) of the optical densities of a sample after exposure to the xenon arc lamp for one hour (D) to those of the samples before exposure ($D_o$) was as follows:

Sample containing N-ethyl-m-toluidine, $D/D_o=0.94$
Blank sample not containing N-ethyl-m-toluidine, $D/D_o=0.72$ With regard to any dyes we tested, similar effect of preventing or controlling fading was attained.

In Example 18 the color filter materials is coated on a transparent support or base, but the material may also be dispersed or dissolved in a solid or a liquid transparent base.

Further, it should be understood that any suitable combinations of the stabilizing compounds can be adopted in the invention though in the above examples only single compound is used in each case.

This invention is applicable to contact screens for photomechanical printing as well as to ordinary photographic safe light filters and color filters for separate exposure.

What we claim is:

1. A composition comprising at least one dye selected from the group consisting of azomethine and indoaniline and at least one of the compound (I) represented by the general formula

wherein $R_1$ is a member selected from the group consisting of unsubstituted alkyl, hydroxy-substituted alkyl and alkanesulfonamide alkyl groups and may be condensed with $R_2$ or Ar forming a heterocyclic ring; $R_2$ is a member selected from the group consisting of hydrogen, unsubstituted alkyl, hydroxy-substituted alkyl and alkanesulfonamide alkyl groups, and Ar is a member selected from the group consisting of unsubstituted phenyl groups and phenyl groups substituted with at least one member selected from the group consisting of alkyl and alkoxyl groups.

2. The composition according to claim 1, wherein the compound (I) amounts to 0.1 to 100% relative to the dye.

3. A color photographic material comprising a photographic emulsion which contains at least one dye selected from the group consisting of azomethine and indoaniline and 0.01–10% of the compound (I) as defined in claim 1.

4. A composition comprising at least one dye selected from the group consisting of azomethine and indoaniline, and a compound selected from the group consisting of N-methylaniline, N-ethyl-m-toluidine, N-ethyl-2,4-dimethylaniline, N-ethyl-4-methoxyaniline, N-ethyl-2-methoxyaniline, N - (2 - hydroxyethyl)-3-methylaniline, N - (2-methanesulfonamido-ethyl)-N-ethyl-3-methyl aniline, N-ethyl-2-methoxy-5-methyl aniline and

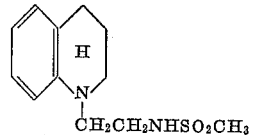

5. The color photographic material according to claim 3 wherein compound I is selected from the group consisting of N-methylaniline, N-ethyl-m-toluidine, N-ethyl-2,4-dimethylaniline, N-ethyl-4-methoxy aniline, N-ethyl-2-methoxyaniline, N - (2-hydroxyethyl)-3-methylaniline, N - (2-methanesulfonamido-ethyl) - N - ethyl-3-methyl aniline, N-ethyl-2-methoxy-5-methyl aniline and

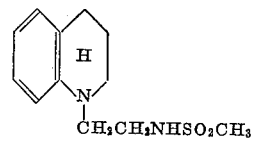

6. A color photographic material according to claim 5 wherein the compound is N-methylaniline.

7. A color photographic material according to claim 5 wherein the compound is N-ethyl-m-toluidine.

8. A color photographic material according to claim 5 wherein the compound is N-ethyl-2,4-dimethylaniline.

9. A color photographic material according to claim 5 wherein the compound is N-ethyl-2-methoxyaniline.

10. A color photographic material according to claim 5 wherein the compound is N-(2-hydroxyethyl)-3-methylaniline.

11. A color photographic material according to claim 5 wherein the compound is N-(2-methanesulfonamido-ethyl)-N-ethyl-3-methyl aniline.

12. A color photographic material according to claim 5 wherein thec ompound is N-ethyl-2-methoxy-5-methyl aniline.

13. A color photographic material according to claim 5 wherein the compound is:

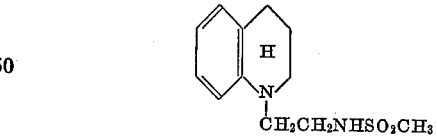

14. A color photographic material according to claim 5 wherein the compound is N-ethyl-4-methoxy aniline.

No references cited.

NORMAN G. TORCHIN, *Primary Examiner.*

J. RAUBITSCHEK, *Examiner.*